US010635771B2

(12) United States Patent
Lin et al.

(10) Patent No.: US 10,635,771 B2
(45) Date of Patent: Apr. 28, 2020

(54) METHOD FOR PARASITIC-AWARE CAPACITOR SIZING AND LAYOUT GENERATION

(71) Applicant: AnaGlobe Technology, Inc., Hsinchu (TW)

(72) Inventors: Po-Hung Lin, Hsinchu County (TW); Vincent Weihao Hsiao, Tainan (TW); Chun-Yu Lin, New Taipei (TW); Nai-Chen Chen, Tainan (TW); Yu-Tsang Hsieh, Hsinchu County (TW)

(73) Assignee: AnaGlobe Technology, Inc., Hsinchu (TW)

( * ) Notice: Subject to any disclaimer, the term of this patent is extended or adjusted under 35 U.S.C. 154(b) by 380 days.

(21) Appl. No.: 15/787,696

(22) Filed: Oct. 18, 2017

(65) Prior Publication Data

US 2019/0114381 A1    Apr. 18, 2019

(51) Int. Cl.
*G06F 17/50*    (2006.01)

(52) U.S. Cl.
CPC ...... *G06F 17/5068* (2013.01); *G06F 17/5081* (2013.01); *G06F 2217/82* (2013.01)

(58) Field of Classification Search
CPC ............. G06F 17/5081; G06F 17/5036; G06F 17/563; H01L 27/0805; H03H 11/28; H03M 1/468; H03M 1/804
See application file for complete search history.

(56) References Cited

U.S. PATENT DOCUMENTS

| 5,194,802 A * | 3/1993 | Hill ........................ G05F 1/563 323/280 |
| 5,903,469 A * | 5/1999 | Ho ....................... G06F 17/5081 716/115 |
| 6,225,678 B1 * | 5/2001 | Yach .................... H01L 27/0805 257/532 |
| 7,102,557 B1 * | 9/2006 | Frith ..................... H03M 1/804 327/337 |

(Continued)

OTHER PUBLICATIONS

Mark Po-Hung Lin, Vicent Wei-Hao Hsiao, Chun-Yu Lin, Nai-Chen Chen, Parasitic-Aware Common-Centroid Binary-Weighted Capacitor Layout Generation Integrating Placement, Routing, and Unit Capacitor Sizing, IEEE Transactions on Computer-Aided Design of Integrated Circuits and Systems, Mar. 21, 2017, pp. 1274-1286 (vol. 36, Issue: 8, Aug. 2017).

*Primary Examiner* — Kandasamy Thangavelu
(74) *Attorney, Agent, or Firm* — Chin Feng Yeh; Huntington IP Consulting Co., Ltd.

(57) ABSTRACT

A method for parasitic-aware capacitor sizing and layout generation is proposed, which is executed by a computer, the method comprising using the computer to perform the following: creating a capacitor sizing and parasitic matching sequence to represent a unit capacitor size, routing topology and routing patterns of a plural of nets in a capacitor network. Next, a shielding assignment is performed to create a number of shielding portions of each net in the plural of nets. Then, a fitness evaluation of configurations of the capacitor sizing and parasitic matching sequence is performed. A shielding net routing is performed to compensate (Continued)

unmatched parasitic capacitance of the configurations of the capacitor sizing and parasitic matching sequence.

20 Claims, 10 Drawing Sheets

(56) References Cited

U.S. PATENT DOCUMENTS

| | | | | |
|---|---|---|---|---|
| 7,802,220 | B1* | 9/2010 | Popovich | G06F 17/5036 |
| | | | | 716/120 |
| 8,471,755 | B1* | 6/2013 | Figueiredo | H03M 1/468 |
| | | | | 341/155 |
| 2005/0017321 | A1* | 1/2005 | Hakkarainen | H01L 27/0805 |
| | | | | 257/532 |
| 2011/0002080 | A1* | 1/2011 | Ranta | H03H 11/28 |
| | | | | 361/277 |
| 2013/0326447 | A1* | 12/2013 | Huang | G06F 17/5081 |
| | | | | 716/112 |

* cited by examiner

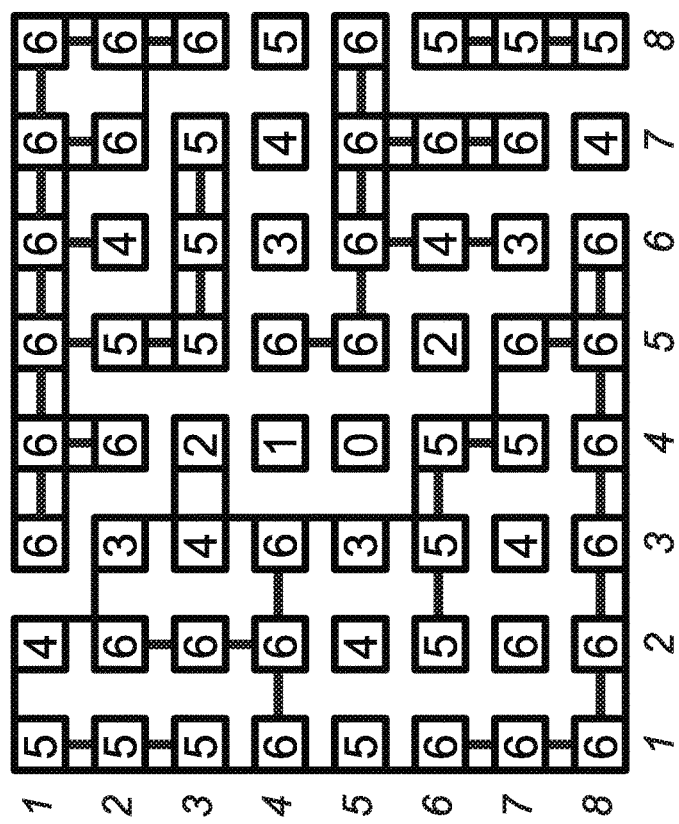
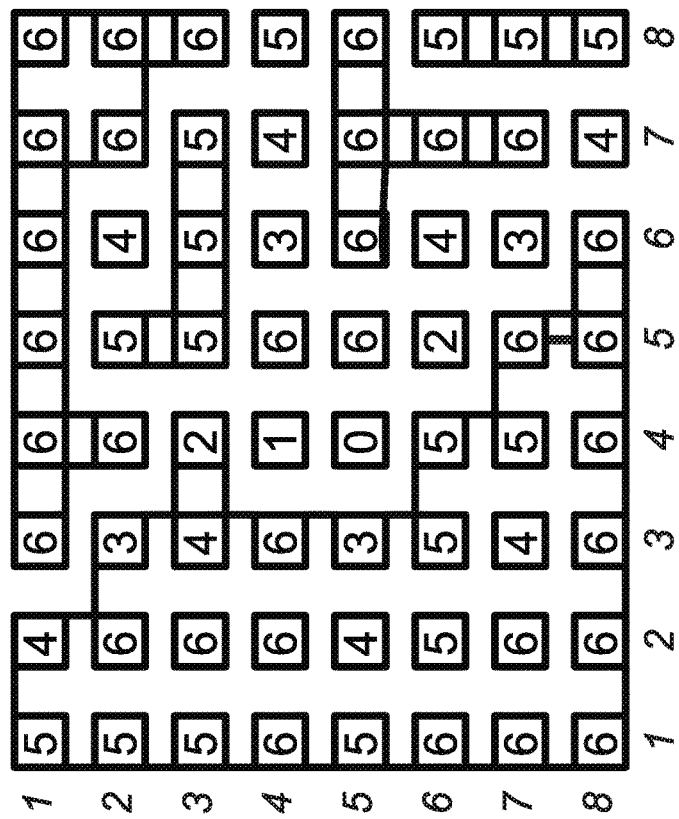
Fig.4b
Fig.4a

METHOD FOR PARASITIC-AWARE CAPACITOR SIZING AND LAYOUT GENERATION

TECHNICAL FIELD

The present invention relates to a capacitor layout, and more particularly, to a method for parasitic-aware capacitor sizing and layout generation.

BACKGROUND

Capacitor sizing is a crucial step when designing charge-scaling digital-to-analog converters (DACs). Larger capacitor size can achieve better circuit accuracy and performance due to less impact from process gradient, parasitic mismatch, and local variation. However, it also results in larger chip area and higher power consumption. The size of binary-weighted capacitors in charge-scaling DACs is highly sensitive to the routing parasitics. Unmatched routing parasitics among binary-weighted capacitors will lead to large capacitor size for satisfying circuit accuracy and performance. Previous work focuses on the study of generating high-quality common-centroid placement of unit capacitor arrays while ignoring routing parasitics. None of them address the sizing of binary-weighed capacitors.

The charge-scaling digital-to-analog converters (DACs) is one of the most important and common implementations of the successive-approximation-register (SAR) analog-to-digital converters (ADCs) which has the advantage of lower power consumption and is widely used in many biomedical or battery-powered circuits and systems. It consists of an array of individually switched binary-weighted capacitors and a comparator, which perform a binary search in conjunction with SARs. The accuracy and performance of a charge-scaling DAC are highly correlated with the accuracy of capacitance ratio of binary-weighted capacitors, while the power consumption of a charge-scaling DAC depends on absolute capacitance values.

Although layout synthesis techniques for ratioed capacitors had been extensively studied, most of the previous works only emphasized how to generate highly matched common-centroid and/or dispersive placements for ratioed capacitors to minimize the impact from process-gradient-induced mismatch. They failed to consider the routing parasitics which may destroy the resulting matching properties of ratioed capacitors, even if the placement is perfectly matched.

When designing the capacitor layout of a charge-scaling DAC, the accuracy of capacitance ratios correlates closely with the matching properties among the binary-weighted capacitors and the induced parasitics due to interconnecting wires. Some of the parasitic capacitors may affect the stability of reference voltage. To minimize the impact on circuit accuracy due to the parasitic capacitors, a simple yet effective approach is to enlarge the capacitance of all binary-weighted capacitors. However, such an approach may not be suitable for modern battery-powered system-on-chips (SoCs) because the large capacitance values of binary-weighted capacitors will significantly increase both chip area and power consumption.

None of the previous works mentioned how to simultaneously minimize unit capacitor size and match routing parasitics during common-centroid layout generation of unit capacitor arrays. Therefore, the present invention simultaneously considers capacitor sizing and parasitic matching during common-centroid capacitor layout generation such that the power consumption is minimized while the circuit accuracy/performance is also satisfied.

SUMMARY

In this disclosure of the present invention, a method for parasitic-aware capacitor sizing and layout generation is proposed, which is executed by a computer, the method comprising using the computer to perform the following: creating a capacitor sizing and parasitic matching sequence to represent a unit capacitor size, routing topology and routing patterns of a plural of nets in a capacitor network; performing a shielding assignment to create a number of shielding portions of each net in the plural of nets; performing a fitness evaluation of configurations of the capacitor sizing and parasitic matching sequence; and performing a shielding net routing to compensate unmatched parasitic capacitance of the configurations of the capacitor sizing and parasitic matching sequence.

According to one aspect of this disclosure of the present invention, the method further comprises acquiring a process technology file.

According to another aspect, the method further comprises simultaneous common-centroid placement and trunk-wire planning of unit capacitors.

According to one aspect, the method further comprises common-centroid detailed routing after said simultaneous common-centroid placement and trunk-wire planning. The common-centroid detailed routing includes common-centroid routing for bottom plates of the unit capacitors, and common-centroid routing for top plates of the unit capacitors.

According to one aspect, the routing patterns include overlapped wire, nonoverlapped wire and single wire.

According to one aspect, a genetic algorithm is applied to explore best configuration of the capacitor sizing and parasitic matching sequence for parasitic matching. The shielding portions are shielding wire segments, connected to some nets which connects bottom plates of said unit capacitors.

In the invention, a non-transitory computer-readable medium containing instructions is proposed, which when read and executed by a computer, cause the computer to execute a method for parasitic-aware capacitor sizing and layout generation, wherein the method comprises the above-mentioned steps.

BRIEF DESCRIPTION OF THE DRAWINGS

The components, characteristics and advantages of the present invention may be understood by the detailed descriptions of the preferred embodiments outlined in the specification and the drawings attached:

FIGS. 4a to 4b show an example of bottom plate routing for the common-centroid unit capacitor array in searching for all connected components of the same unit capacitors, and constructing a MST for each connected component, respectively;

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

In this invention, a method for parasitic-aware common-centroid binary-weighted capacitor layout generation by integrating placement, routing, and unit capacitor sizing is proposed. In order to reduce both chip area and power consumption of a charge-scaling digital-to-analog converter (DAC) or a successive approximation register analog-to-digital converter (SAR ADC), the routing parasitic capacitance may be carefully matched and the unit capacitor size of a common-centroid unit capacitor array may be minimized. Based on the problem formulation, a parasitic-aware sizing, placement, and routing flow for the binary-weighted capacitors in a charge-scaling DAC consists of three major steps: (1) Simultaneous common-centroid placement and trunk-wire planning; (2) Common-centroid detailed routing; and (3) Simultaneous capacitor sizing and parasitic matching.

Figure 1:
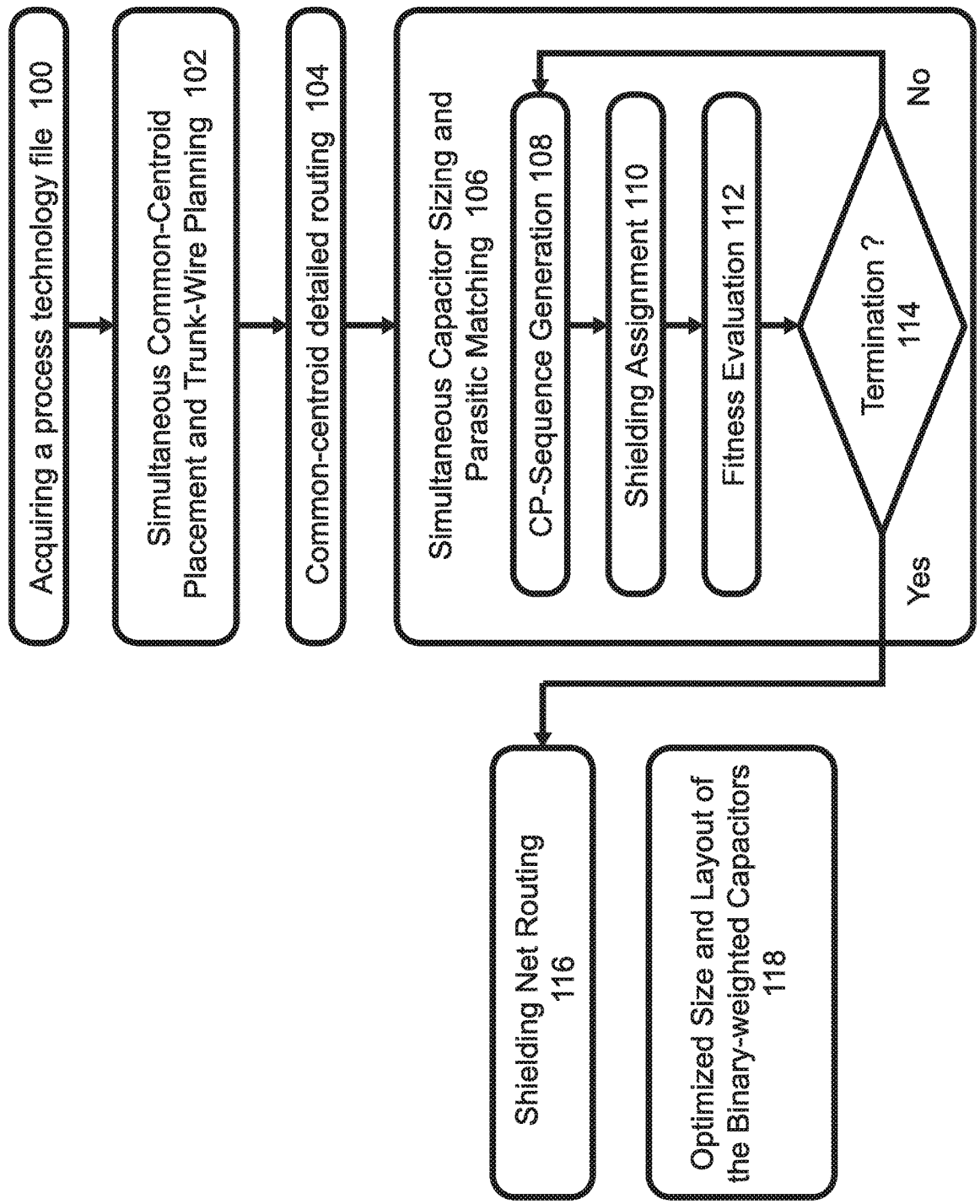
FIG. 1 shows a process flows of the proposed parasitic-aware binary-weighted capacitor sizing, placement, and routing with shielding routing according to an embodiment of the invention

As shown in FIG. 1, it illustrates a process flow of a method for parasitic-aware capacitor sizing and layout generation of an IC-layout in accordance with one embodiment of the present invention, which includes the following steps. In step 100, a process technology file is acquired. The process technology file is for example a process design kit (PDK), which is a set of files used within the semiconductor industry to model a fabrication process for the design tools used to design an integrated circuit. The parasitic-aware capacitor sizing and layout generation of integrated circuits may be achieved by the process technology file or the process design kit (PDK).

Figure 2:
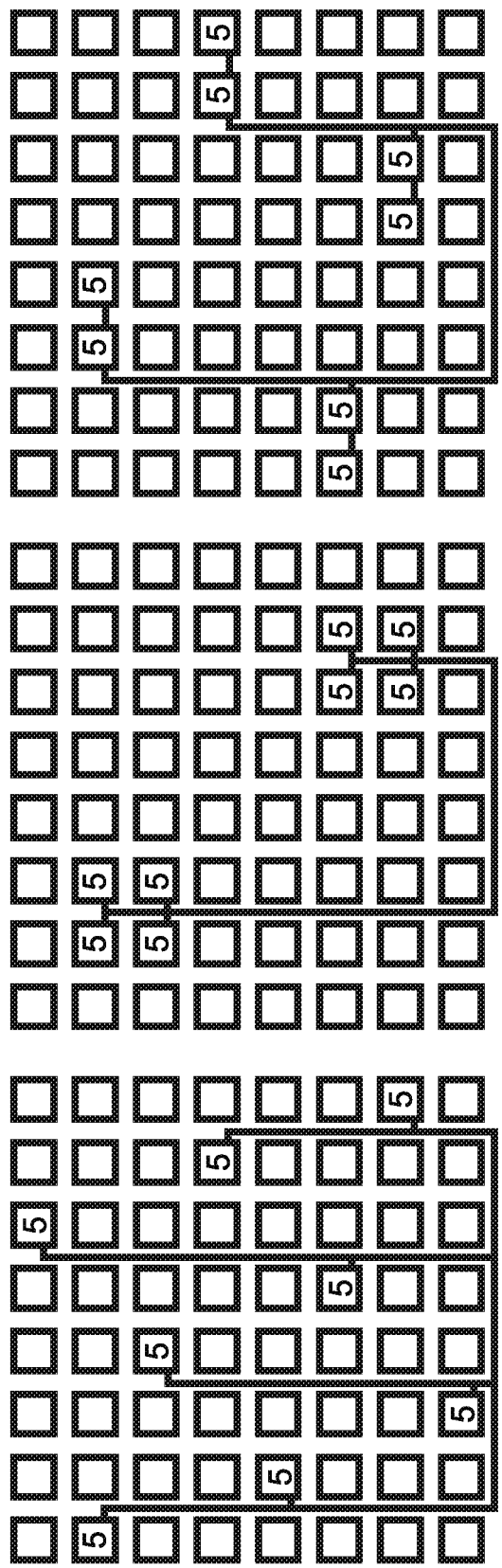
FIGS. 2a to 2c show different common-centroid placement styles resulting in different amounts of routing parasitics in disconnected unit capacitors, connected unit capacitors and globally distributed locally connected unit, respectively.
Figure 3:
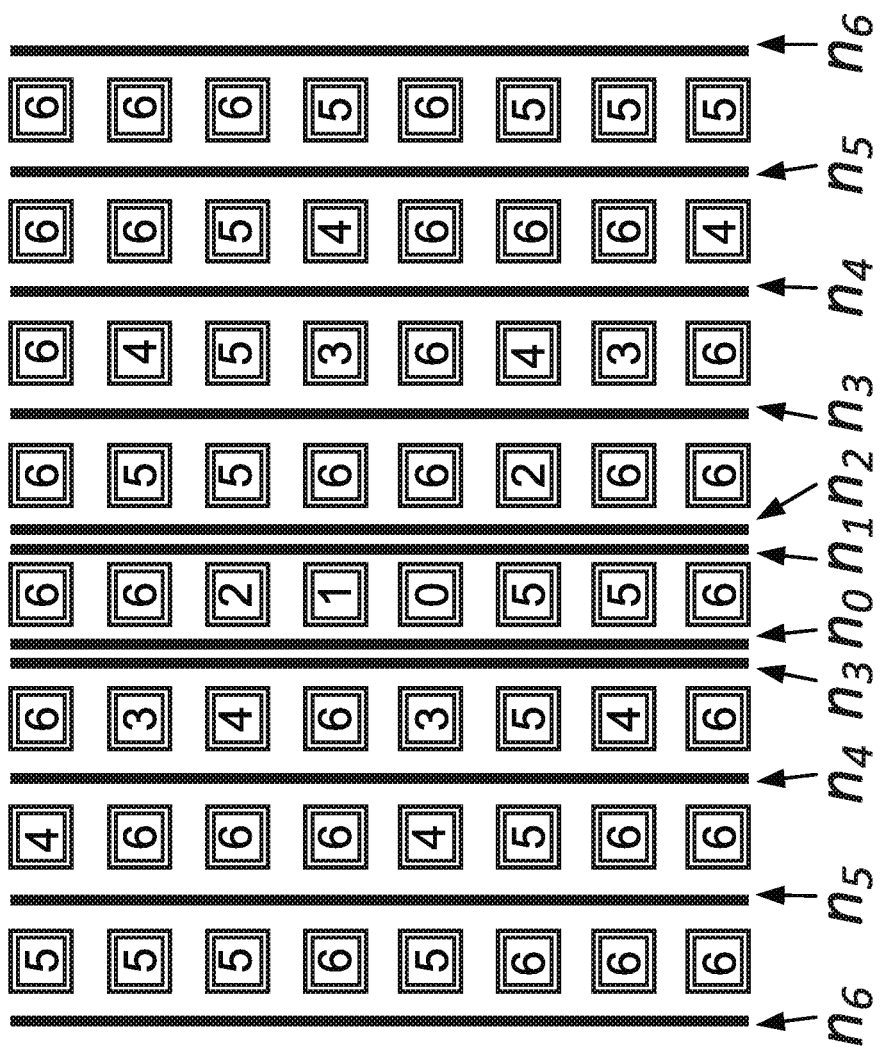
FIG. 3 illustrates an optimized common-centroid placement and trunk-wire planning for the binary-weighted capacitors in a 6-bit charging-scaling DAC.

Next, in step 102, simultaneous common-centroid placement and trunk-wire planning are performed. According to a reference 1 ("Common-centroid capacitor layout generation considering device matching and parasitic minimization," IEEE Trans. Comput.-Aided Design Integr. Circuits Syst., vol. 32, no. 7, pp. 991-1002, July 2013), different common-centroid placement styles may result in different amounts of routing parasitics due to different numbers of required trunk wires for routing completeness, as demonstrated in FIGS. 2a-2c. The placement style of disconnected unit capacitors, as shown in FIG. 2a, requires totally four trunk wires to connect all unit capacitors belong to the same capacitor, while the placement style of connected unit capacitors and globally distributed locally connected unit capacitors, as shown in FIGS. 2b and 2c, only require two trunk wires. It was concluded that the placement style of globally distributed locally connected unit capacitors has the best tradeoff between the matching quality and the amount of routing parasitics. The approach of the reference 1 is applied to simultaneously obtain an optimized placement and optimal trunk wire planning with minimized process-gradient-induced mismatch, maximized overall correlation coefficient, and minimum and balanced number of trunk wires in each routing channel based on the placement style of globally distributed locally connected unit capacitors. The initial unit capacitor size is assigned with the mean value of the maximum and minimum unit capacitor size given by a process technology file or a process design kit. FIG. 3 shows an optimized common-centroid placement and trunk-wire planning for the binary-weighted capacitors in a 6-bit charging-scaling DAC. With a minimal number of trunk wires in a common-centroid unit capacitor array, the capacitors can be matched even better due to the compactness. The routing parasitics can also be minimized due to shorter interconnecting wirelength. In the reference 1, it has been demonstrated and shown that the common-centroid layouts generated by the proposed approach can achieve better process-gradient-induced mismatch, higher overall correlation among unit capacitors, smaller total area and interconnecting wirelength, reduced routing parasitics, and improved accuracy of capacitance ratios.

Subsequently, in step 104, a common-centroid detailed routing is performed. The invention proposes a simple yet effective approach to generate common-centroid routing. The routing styles generated by the proposed approach will help the succeeding step to minimize unit capacitor size while matching routing parasitic capacitor $C^{TB}$ (top plate to bottom plate) and $C^{TS}$ (top plate to substrate). The common-centroid detailed routing includes common-centroid routing for bottom plates and common-centroid routing for bottom plates.

Regarding to the common-centroid routing for bottom plates, to connect the bottom plates of the unit capacitors belonging to the same binary-weighted capacitor while satisfying the common-centroid constraint, the breadth-first-search algorithm starting from either corner of the common-centroid unit capacitor array is applied to search for the connected components formed by adjacent unit capacitors belonging to the same binary-weighted capacitor. Once a set of unit capacitors forming a connected component is identified, another set of unit capacitors at the symmetric counterpart is also considered as a connected component since the placement is common-centroid. It shall specially handle the routing for the noncommon-centroid placement region which only appears at the center of the unit capacitor array of binary-weighted capacitors based on the placement approach in the reference 1. FIG. 4a shows the resulting connected components of the common-centroid unit capacitor array of a 6-bit charging-scaling DAC in placement of the binary-weighted capacitors, where the connected components containing more than one unit capacitor are highlighted with rectilinear bounding boxes. After all connected components are identified, a minimum-spanning-tree (MST) algorithm (referring to the reference 2: T. H. Cormen, C. E. Leiserson, R. L. Rivest, and C. Stein, Introduction to Algorithms, 3rd ed. Cambridge, Mass., USA: MIT Press, 2009) is applied to connect the unit capacitors in the same connected component. For the example in FIG. 3, the weights of all vertical edges are set to the minimum spacing rule between two adjacent unit capacitors since there is no horizontal trunk wires, while the weights of all horizontal edges are calculated according to the maximum number of required routing tracks among all channels and the respective design rules from the technology file. FIG. 4b shows the resulting MST of each connected component. The MST of each symmetric connected component is simply mirrored. Based on the proposed approach, all wire segments connecting the bottom plates of adjacent unit capacitors are common-centroid if and only if the placement is common-centroid.

For routing the four noncommon-centroid unit capacitors at the center of the unit capacitor array, the unit capacitors are simply connected to their closest adjacent unit capacitors, as shown in FIG. 4b. Finally, the disjoint connected components belonging to the same binary-weighted capacitor are further connected to the corresponding trunk wires, as shown in FIG. 3, such that the bottom plates of all unit capacitors belonging to the same binary-weighted capacitor are connected.

Figure 5B:
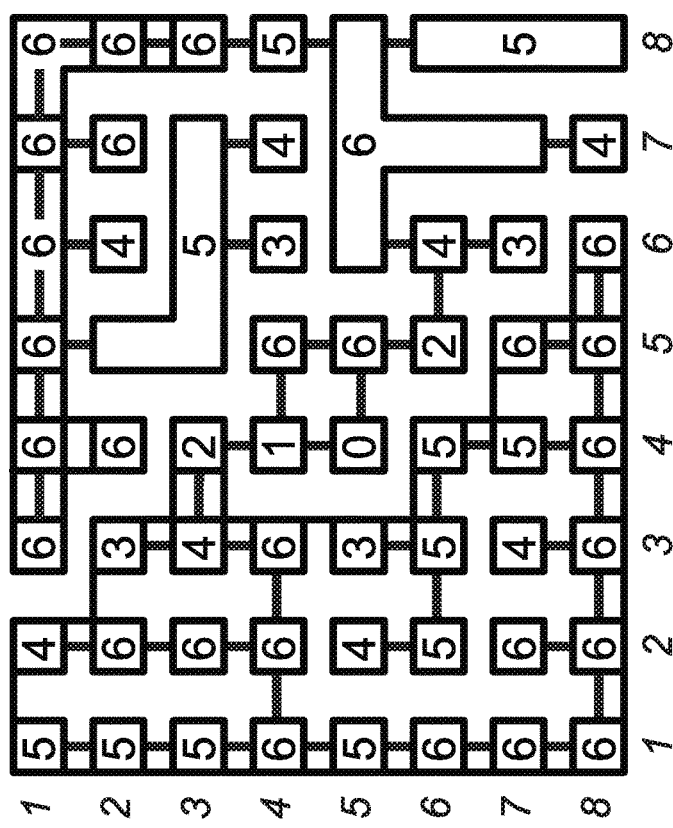
FIGS. 5a to 5b show an example of top plate routing for the common-centroid unit capacitor array in duplicating the MSTs in FIG. 4b, and constructing a MST among the disjoint connected components in FIG. 5a, respectively.
Figure 5A:
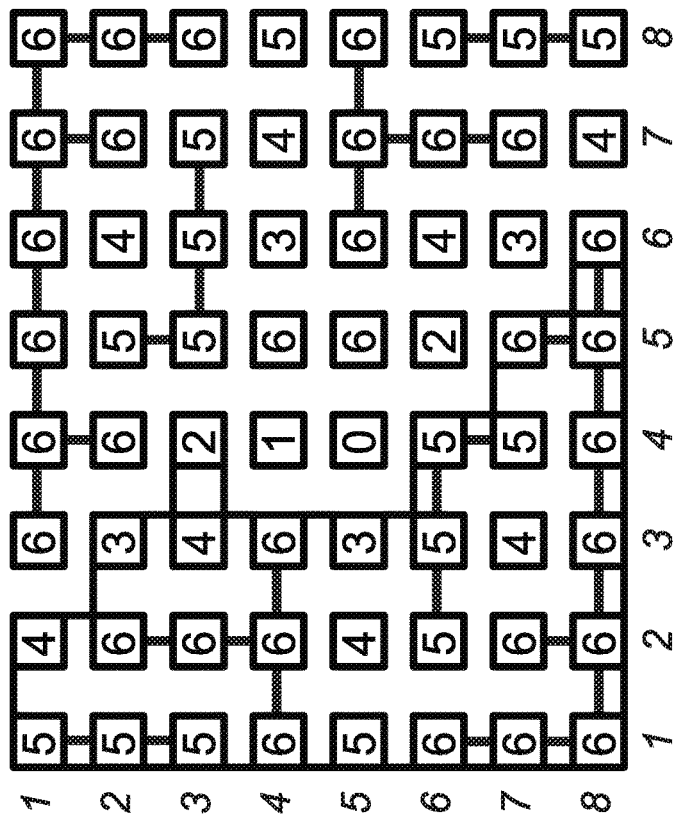

Regarding to the common-centroid routing for top plates, a simple regular pattern is applied, such as the one in the reference 1, for top plate routing that may introduce a large amount of $C^{TS}$ and hence have great impact on circuit accuracy. In order to minimize unwanted $C^{TS}$ for achieving accurate circuit specifications, the metal wires connecting the top plates of adjacent unit capacitors should be shielded from the substrate as much as possible. It may consider the metal wires connecting the bottom plates of adjacent unit capacitors as possible candidates of shielding wires. With such shielding consideration, the routing topology among the top plates of unit capacitors will be similar to the routing topology among the bottom plates of unit capacitors. Since the top plates of the binary-weighted capacitors are all connected to the same net, to generate common-centroid routing for connecting the top plates of all unit capacitors, the MSTs in FIG. 4b are simply duplicated from bottom plates to top plates, as shown in FIG. 5a. After duplicating the MSTs, the unit capacitors form a set of disjoint connected components. It then constructs another MST to connect all the disjoint connected components. FIG. 5b shows the resulting MST which connects all the disjoint connected components. Similar to bottom plate routing, the routing for the unit capacitors on the symmetric counterpart is simply mirrored, and the routing for the four noncommon-centroid unit capacitors at the center of the unit capacitor array is specially handled.

Figure 6:
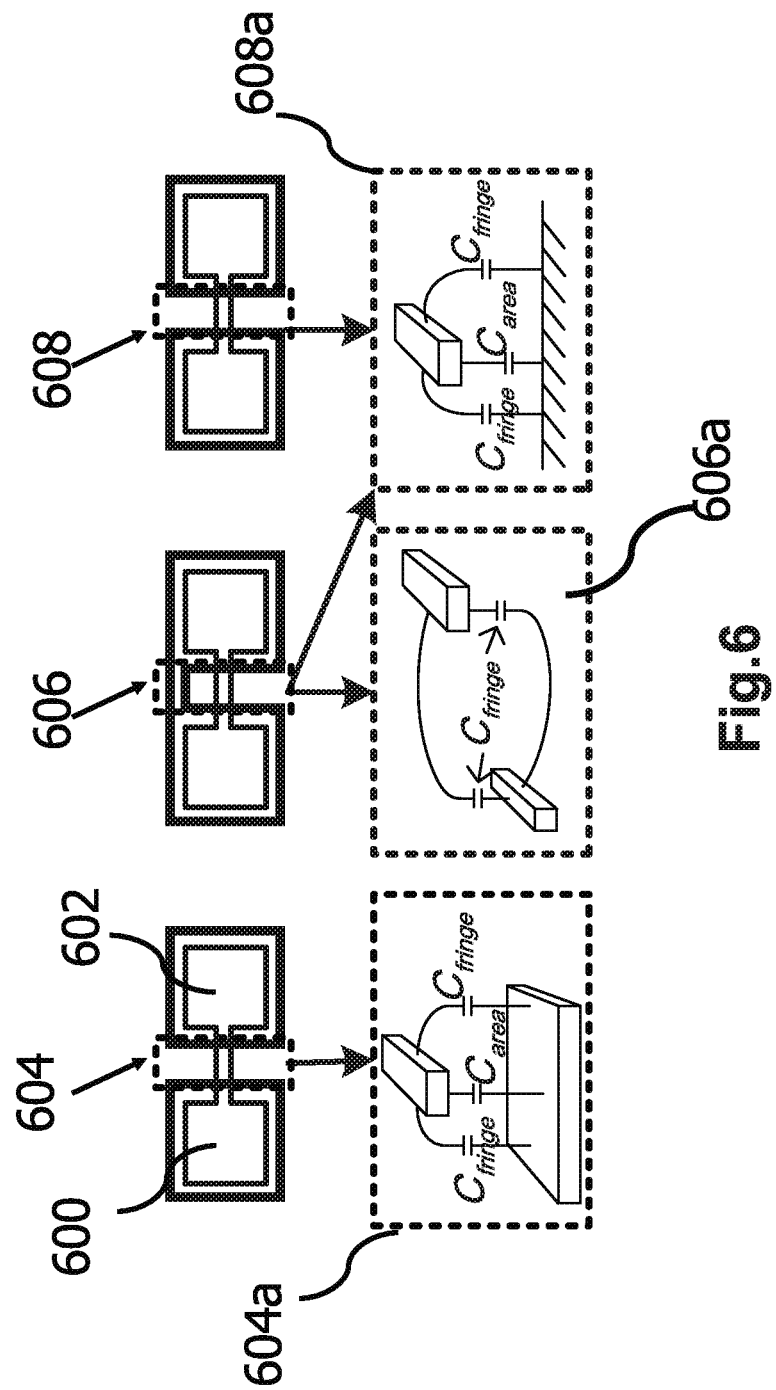
FIG. 6 illustrates routing patterns and the corresponding parasitic capacitance of overlapped wires, nonoverlapped wires and single wire.

The common-centroid routing may result in three different routing patterns between any two adjacent unit capacitors (600, 602), including overlapped wires 604, nonoverlapped wires 606 and single wire 608, as shown in FIG. 6. For example, if two adjacent unit capacitors have both top placement and bottom plate connections, the routing pattern can be either "overlapped wires" 604 or "nonoverlapped wires" 606. If two adjacent unit capacitors have only top plate connection, the routing pattern will be "single wire" 608. The parasitic capacitance, $C^{TB}$ and $C^{TS}$, resulting from different routing patterns may be analyzed because $C^{TB}$ and $C^{TS}$ have the greatest impact on circuit accuracy/performance. The routing pattern overlapped wires 604 will result in the parasitic capacitance 604a, $C^{TB}_{overlap}$, which is equal to the summation of both area capacitance $C_{area}$ and fringe capacitance $C_{fringe}$ between the two overlapped wires connecting the top plate and the bottom plate of the adjacent unit capacitors, respectively, as shown in FIG. 6. The routing pattern nonoverlapped wires 606 will result in both parasitic capacitance, $C^{TB}_{nonoverlap}$ 606a and $C^{TS}_{nonoverlap}$ 608a, where $C^{TB}_{nonoverlap}$ is equal to $C_{fringe}$ between the two parallel, but nonoverlapped wires on different layers, while $C^{TS}_{nonoverlap}$ is equal to the summation of $C_{area}$ and $C_{fringe}$ between the wire connecting the top plates of the adjacent unit capacitors and the substrate. The routing pattern single wire 608 will result in the parasitic capacitance 608a, $C^{TS}_{single}$, which is equal to the summation of $C_{area}$ and $C_{fringe}$ between the wire connecting the top plates of the adjacent unit capacitors and the substrate. The parasitic capacitance 604a is resulting from the overlapped wires, the parasitic capacitance 606a is resulting from the nonoverlapped wires, and the parasitic capacitance 608a is resulting from both nonoverlapped wires and single wire. Based on the routing patterns, both parasitic capacitance, $C^{TB}$ and $C^{TS}$, resulting from each routing pattern can be accurately simulated by performing post-layout parasitic extraction tools. Consequently, the overall routing parasitic capacitance within a common-centroid unit capacitor array can be more accurately estimated, and the real output voltage, differential nonlinearity (DNL) and integral nonlinearity (INL) of a charge-scaling DAC become more predictable.

In the following, in step 106, a capacitor sizing and parasitic matching is performed, which includes the following procedures 108~114. First, in step 108, a capacitor sizing and parasitic matching sequence (CP-sequence) is generated. In this stage, capacitor sizing and parasitic matching are simultaneously performed or serially performed. For example, capacitor sizing is performed and then parasitic matching is performed, followed by performing capacitor resizing. Then, in step 110, a shielding assignment is performed. Next, in step 112, a fitness evaluation is performed. In step 114, it checks whether the termination condition is reached or not. If the termination condition is reached, a shielding net routing in step 116 is then performed after checking. If the termination condition is not reached, it back to the step 108 after checking. Finally, in the step 118, an optimized size and layout of the binary-weighted capacitors is obtained.

Figure 7B:
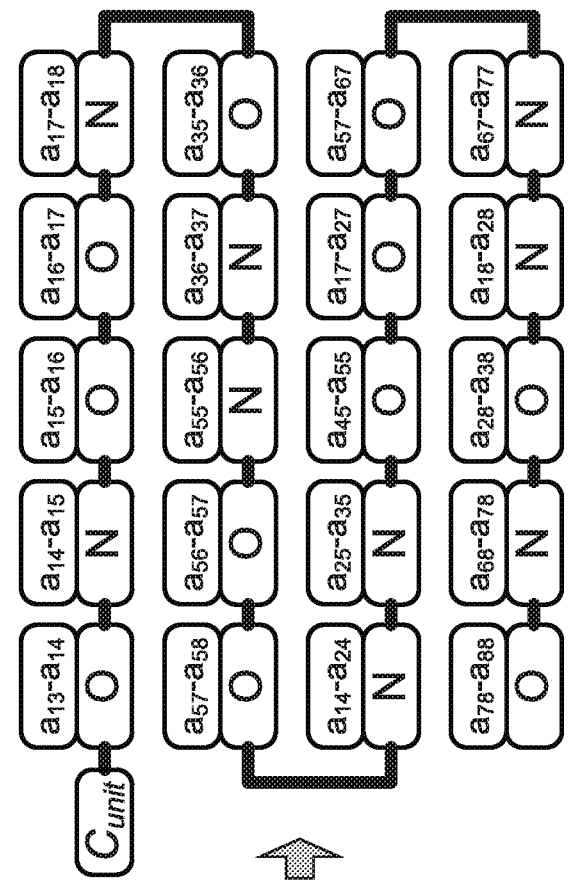
FIG. 7b shows a corresponding CP-sequence of FIG. 7b.
Figure 7A:
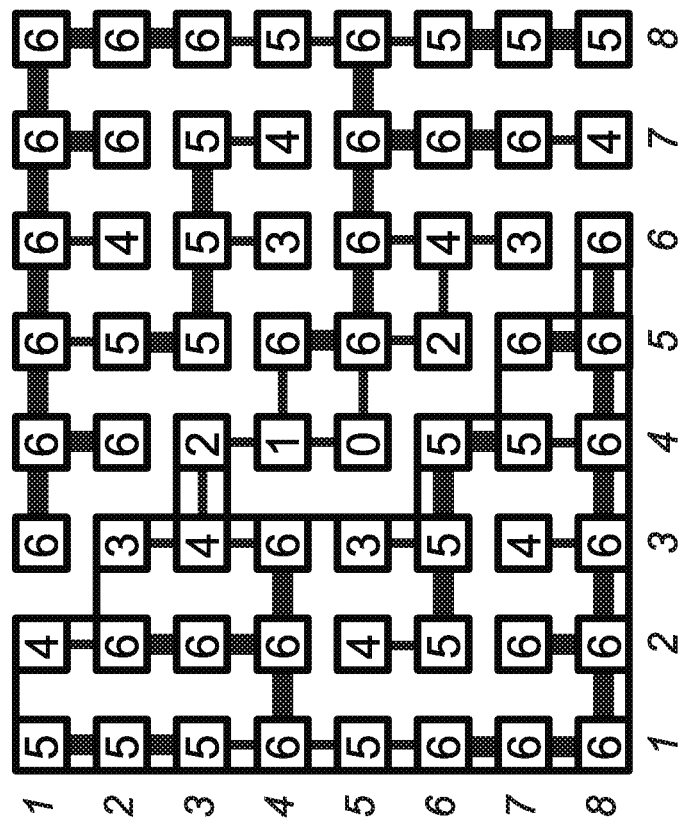
FIG. 7a shows a common-centroid unit capacitor array with optimized placement and routing topologies.

In order to select the best routing pattern between each adjacent unit capacitors for better parasitic matching while minimizing unit capacitor size for power minimization, in step 108, a capacitor sizing and parasitic matching sequence (CP-sequence) is introduced, which represents the unit capacitor size, routing topology, and routing patterns. Based on the CP-sequence, the genetic algorithm (D. E. Goldberg, Genetic Algorithms in Search, Optimization, and Machine Learning. Boston, Mass., USA: Addison-Wesley, 1989) is then applied to explore the best configuration of the sequence. Consequently, the chip area and power consumption of the charge-scaling DAC can be minimized, and both DNL and INL also satisfy the accuracy/performance criteria. After obtaining a common-centroid unit capacitor array, $A_{rxs}$, containing r rows and s columns, with optimized placement and routing topologies, a CP-sequence is constructed to represent the unit capacitor size, routing topology, and routing patterns. A CP-sequence starts with the unit capacitor size, $C_{unit}$, which is followed by the routing patterns of all adjacent unit capacitors having both top plate and bottom plate connections, as shown in FIG. 7a and FIG.

7b. FIG. 7a highlights those adjacent unit capacitors having both top plate and bottom plate connections according to FIGS. 4b and 5b. The sequence of the routing pattern of each adjacent unit capacitors is determined by sweeping through $A_{rxs}$ horizontally and vertically. To maintain the common-centroid routing, the symmetric counterpart is simply ignored when constructing the CP-sequence. FIG. 7b shows the initial CP-sequence which consists of $C_{unit}$ and 20 routing patterns, where each routing pattern is tagged by the corresponding location of the adjacent unit capacitors in FIG. 7a. The initial routing patterns are randomly assigned to either overlapped wires or nonoverlapped wires, labeled by "O" and "N," respectively. The unit capacitor size is randomly generated within a limited range according to the process technology file. Based on the CP-sequence, the genetic algorithm (GA) is applied to explore the best configuration of the sequence for both power minimization and parasitic matching. A fitness function of the genetic algorithm is the inverse of weighted summation of the normalized unit capacitor size. Once the CP-sequence and the fitness function are defined, the genetic algorithm proceeds to initialize a population of solutions represented by different configurations of the CP-sequence, evaluate the fitness values of all solutions in the step 112, and then to improve it through repetitive application of the crossover, mutation, inversion, and selection operators. Such generational process is repeated until a termination condition has been reached in the step 114. Crossover is a process which takes two parent solutions, $CP_1$ and $CP_2$, and produces one or more child solutions from them. Mutation alters one or more gene values in a CP-sequence, $CP_i$, from its original configuration. Inversion rearranges the linear gene sequence in a CP-sequence, $CP_i$, from its original configuration. Selection is a procedure which selects individuals from both original population and derived offspring according to the fitness values.

Figure 8B:
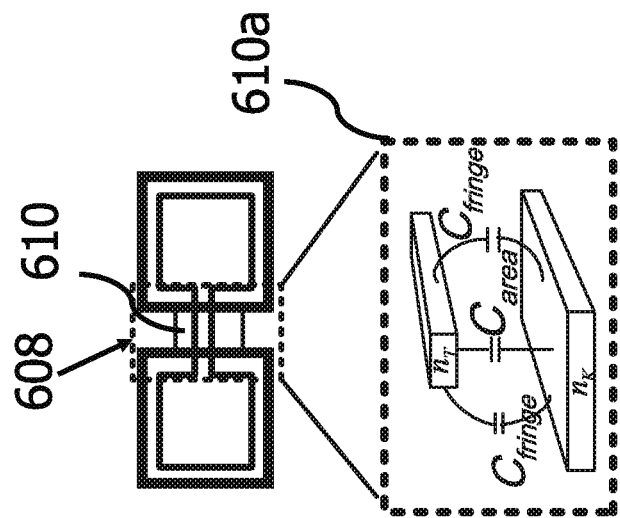
FIGS. 8a to 8b show example of top-plate routing between two adjacent unit capacitors without shielding and with shielding, respectively.
Figure 8A:
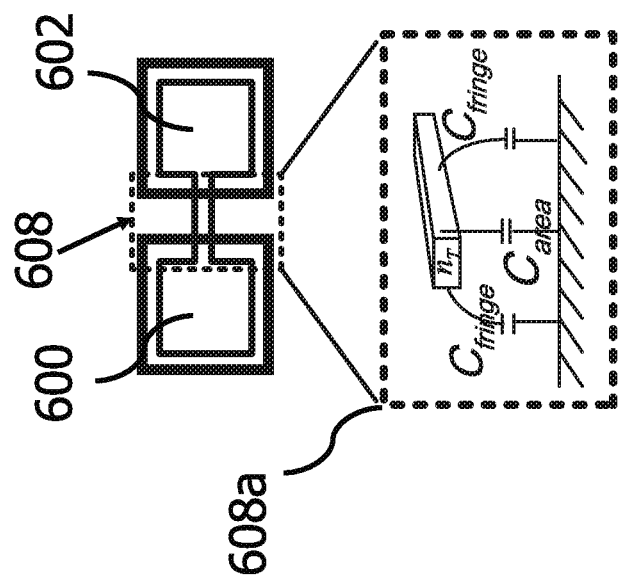

After the CP-sequence is generated, in step 110, a shielding assignment is performed. When obtaining the configuration of routing patterns for connecting adjacent unit capacitors resulting from each CP sequence, the parasitic matching among all routing parasitics with shielding routing is further improved. The idea of shielding routing is to compensate unmatched parasitic capacitance for that CP-sequence configuration without enlarging routing space within the unit capacitor array. It can be done by adding some wire segments at a lower metal layer to shield under the top metal wires connecting the top plates of adjacent unit capacitors. FIG. 8a and FIG. 8b show an example of two adjacent unit capacitors before and after adding a shielding wire segment 610 at a lower metal layer. Top-plate routing between two adjacent unit capacitors without shielding, shown in FIG. 8a, introduces parasitic capacitance between the top plate and substrate, $C^{TS}$, and top-plate routing between two adjacent unit capacitors with shielding, shown in FIG. 8b, eliminates $C^{TS}$. All top-plates of unit capacitors are connected via interconnecting wires. The shielding wires 610 at the lower metal layer are then connected to some nets which connects the bottom plates of unit capacitors for improving parasitic matching.

Figure 9:
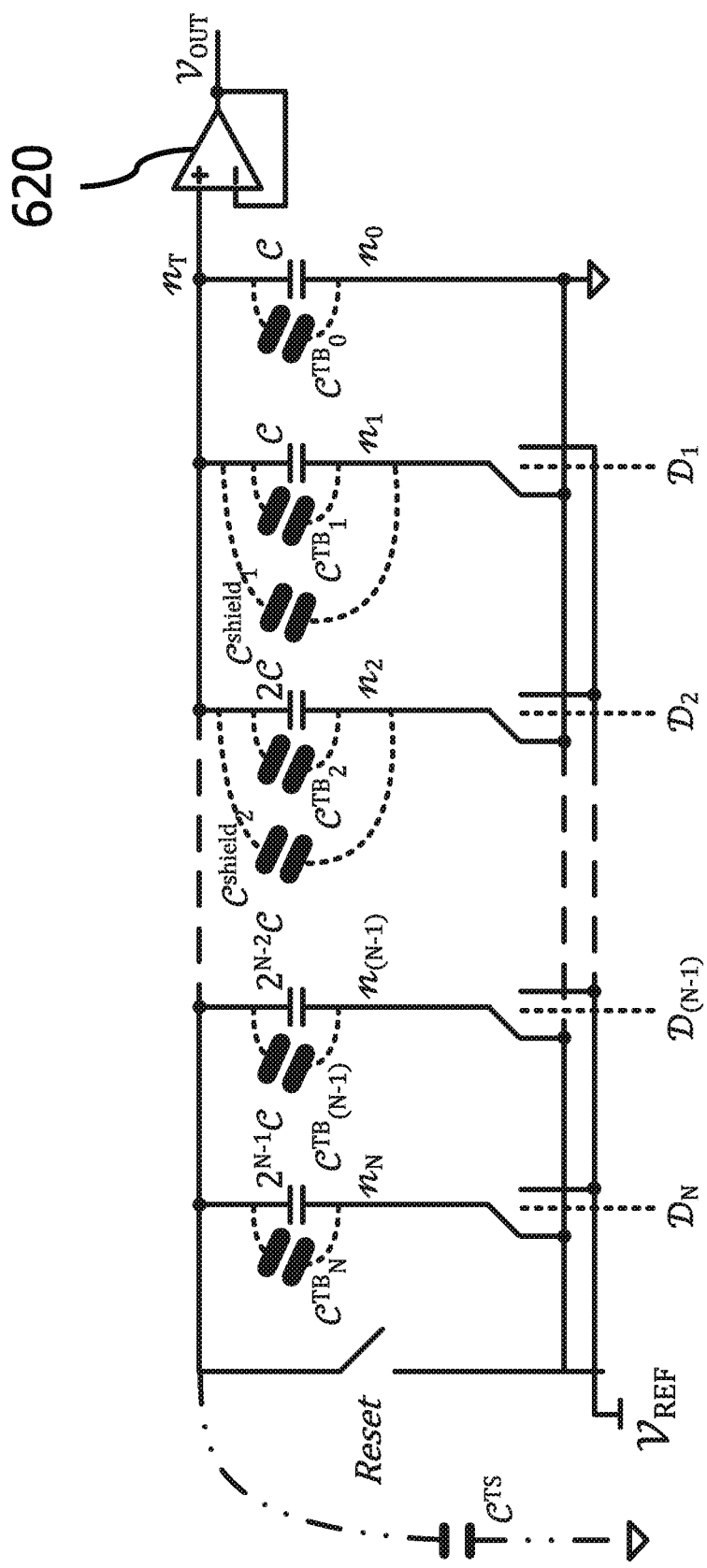
FIG. 9 illustrates an example of charge-scaling DAC after applying shielding routing within the unit capacitor array for improving parasitic matching among binary-weighted capacitors.

FIG. 9 shows an example of N-bits charge-scaling DAC after applying shielding routing within the unit capacitor array for improving parasitic matching among binary-weighted capacitors. The output voltage, $V_{OUT}$, of an ideal charge-scaling DAC only depends on the digital control signals, $D_N, D_{N-1}, \ldots, D_1$, and the binary-weighted capacitors, as shown in FIG. 9. The output voltage, $V_{OUT}$, is outputted via an amplifier 620. The routing parasitic capacitors in a charge-scaling DAC are formed after routing the nets, $n_0, n_1, n_2, \ldots, n_N$, and $n_T$, in the capacitor network.

Figure 10A:
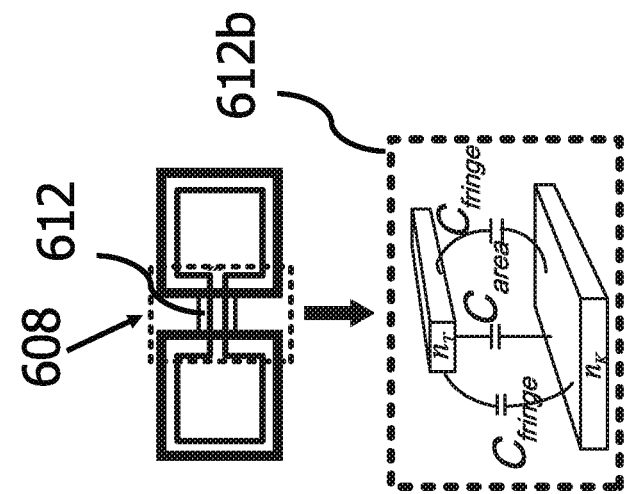
FIGS. 10a to 10b illustrate routing patterns, nonoverlapped wire and single wire, in FIG. 6, with shielding wire segments at a lower metal layer.
Figure 10B:
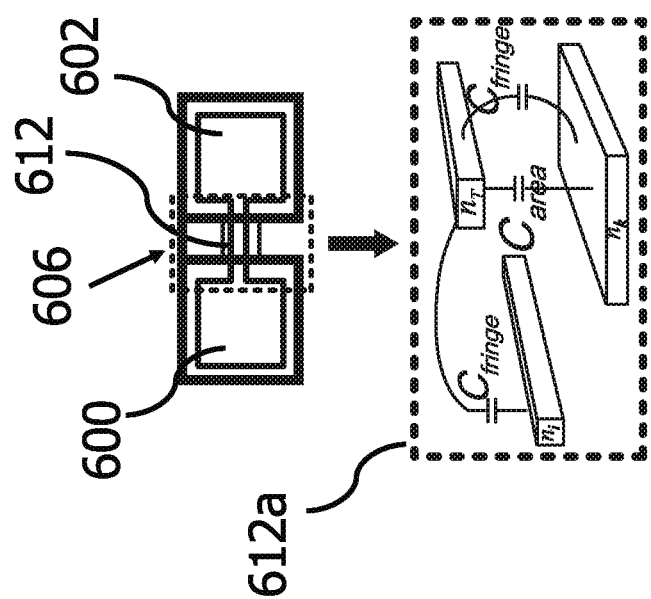

When applying shielding routing, it may consider only the two routing patterns, nonoverlapped wire and single wire, as shown in FIG. 10a and FIG. 10b, resulting from a CP-sequence for further improving parasitic matching. The resulting routing patterns with shielding wires 612 at a lower metal layer are shown in FIG. 10a and FIG. 10b, respectively. The routing pattern single wire 606 in FIG. 10a will result in the parasitic capacitance 612a, and the routing pattern single wire 608 in FIG. 10b will result in the parasitic capacitance 612b. Such shielding routing portion can be formulated into two sub-portions: 1). shielding assignment for available routing patterns and 2). shielding net routing.

1). Shielding Assignment:

Given the numbers of nonoverlapped wire and single wire routing patterns resulting from a CP-sequence, denoted by $P_{nonoverlapped}$ and $P_{single}$, respectively, a number of shielding wire segments to each net, $n_i$, which connects the bottom plate of the binary-weighted capacitor, $C_i$, are applied such that the ratio of routing parasitics among different bits in an N-bit charge-scaling DAC is closer to the ideal ratio among the binary-weighted capacitors. The shielding assignment problem can be optimized by the following integer-linear-programming (ILP) formulation:

$$\min \sum_{i=1}^{N} (\hat{C}_i - \tilde{C}_i)$$

$$\text{s.t.} \sum_{i=1}^{N} p_i \leq P_{nonoverlapped} + P_{single}$$

$$p_i \geq 0, \forall i = 1 \ldots N$$

where $\hat{C}_i$ and $\tilde{C}_i$ are the targeted and real capacitance of the binary-weighted capacitor, $C_i$, respectively, which include the parasitics due to applying the routing patterns, as shown in FIGS. 6 and 10a and 10b, and $p_i$ is the number of required shielding wire segments belonging to the net, $n_i$. $\hat{C}_i$ is estimated according to the maximum routing parasitic without shielding and the ideal ratio among the binary-weighted capacitors, while $\tilde{C}_i$ is calculated by summing of the capacitance of unit capacitors of $C_i$ and all routing parasitics, including those contributed by $p_i$.

The problem size of the ILP formulation for shielding assignment depends on the bit number of a charge-scaling DAC, which is relatively small in real applications. Hence, the number of required shielding wire segments of each net can be solved very efficiently by applying the ILP formulation. With better parasitic matching after shielding assignment, it may obtain even smaller unit capacitor size during capacitor sizing. Consequently, both chip size and power consumption can be further reduced.

2). Shielding Net Routing:

Once the number of required shielding wire segments of each net is obtained, the shielding wire segments are located and then connected to the trunk wires of the corresponding net. Since there is pretty much routing resource at the lower-level metal layer for shielding, a procedural approach is applied to locate and connect the shielding wire segments.

The locations of all nonoverlapped wire and single wire routing patterns resulting from a CP-sequence, and the number of required shielding wire segments of each net are given. For each routing pattern, a shielding wire segment at a lower-level metal layer is added, and then the shielding wire segment is connected to the closest trunk wire of a net if the number of required shielding wire segments of the net has not been reached. However, if the number of required shielding wire segments of the net is reached, the corresponding trunk wires are invalid. Another valid trunk wire is searched for and the shielding wire segment is connected to the trunk wire until all trunk wires become invalid. During shielding net routing, the symmetric property of the common-centroid unit capacitor array is to maintain if the number of required shielding wire segments of a net is even.

Finally, the invention demonstrates the proposed parasitic-aware binary-weighted capacitor sizing, placement, and routing flows with shielding routing in FIG. 1. According to the proposed experimental study, it needs to perform shielding assignment for each newly generated CP sequence during the iterations of GA-based capacitor sizing and parasitic matching for better estimation of the matching quality of parasitics. The detailed routing of shielding nets at a lower-level metal layer does not affect the matching quality of the binary-weight capacitors. Hence, it will be only performed once an optimized CP-sequence is obtained.

In the present invention, the proposed flows and algorithms of parasitic-aware binary-weighted capacitor sizing, placement, and routing may be implemented in the C++ programming language and executed on a 2.26-GHz Intel Xeon machine under the Linux operating system. The experiments may be conducted to show the superiority of the proposed approach without shielding routing compared with the state-of the-art approaches of the reference1, a reference 3 (Y. Li, Z. Zhang, D. Chua, and Y. Lian, "Placement for binary-weighted capacitive array in SAR ADC using multiple weighting methods," IEEE Trans. Comput.-Aided Design Integr. Circuits Syst., vol. 33, no. 9, pp. 1277-1287, September 2014) and a reference 4 (K.-H. Ho, H.-C. Ou, Y.-W. Chang, and H.-F. Tsao, "Coupling-aware length-ratio-matching routing for capacitor arrays in analog integrated circuits," IEEE Trans. Comput.-Aided Design Integr. Circuits Syst., vol. 34, no. 2, pp. 161-172, February 2015). Table I shows the benchmark circuits the invention used, which consist of five charge-scaling DACs ranging from 6 to 10 bits. The experimental results indicate that the-art approaches failed to generate high-quality capacitor layouts with perfectly matched routing parasitic capacitance leading to inaccurate ratios among binary-weighted capacitors. The proposed approach can result in much less process-gradient-induced mismatch and much higher overall correlation coefficient is because the distance between any two unit capacitors in the unit capacitor array is greatly reduced with much smaller unit capacitor size.

TABLE 1

| Circuit | # of Capacitors | Capacitor Ratio | # of Unit Capacitors |
|---|---|---|---|
| DAC_6b | 7 | 1:1:2:4:8:16:32 | 64 |
| DAC_7b | 8 | 1:1:2:4:8:16:32:64 | 128 |
| DAC_8b | 9 | 1:1:2:4:8:16:32:64:128 | 256 |
| DAC_9b | 10 | 1:1:2:4:8:16:32:64:128:256 | 512 |
| DAC_10b | 11 | 1:1:2:4:8:16:32:64:128:256:512 | 1024 |

In another experiment, it finally compared the proposed approaches without and with applying shielding routing for the whole benchmark circuits consisting of five charge-scaling DACs ranging from 6 to 10 bits. According to the experimental results in Table 2 and Table 3, the proposed approach with shielding routing can further reduce 46% unit capacitor size, 34% layout area, and 32% power consumption in average, compared with the proposed approach without shielding routing. It can also further improve 6% process-gradient induced mismatch and 15% overall correlation coefficient because of even shorter distance between any two unit capacitors in the unit capacitor array with smaller unit capacitor size. However, it takes 2.6× execution time for achieving ultimately matched routing parasitics. It is because shielding assignment based on the ILP formulation is performed once and again for every newly generated CP-sequence configuration. The runtime due to shielding assignment can be improved by parallel programming because shielding assignment for different CP-sequence configurations are all independent subproblems, which is a very nice property when applying parallel programming.

TABLE 2

| | Our approach without shielding routing | | | | | | |
|---|---|---|---|---|---|---|---|
| Circuit | $C_{unit}$ (fF) | Aream ($\mu m^2$) | M (%) | $\rho$ | $|DNL|_{max}$ (LSB) | $|INL|_{max}$ (LSB) | Power (nW) | Runtime (s) |
| DAC_6b | 28 | 6468.54 | 0.34 | 6.67 | 0.211 | 0.363 | 47.90 | 16.98 |
| DAC_7b | 39 | 18063.08 | 0.36 | 7.10 | 0.263 | 0.357 | 59.50 | 42.04 |
| DAC_8b | 51 | 35823.18 | 0.39 | 6.06 | 0.132 | 0.403 | 83.91 | 104.35 |
| DAC_9b | 73 | 91500.26 | 0.42 | 4.87 | 0.137 | 0.212 | 113.50 | 248.34 |
| DAC_10b | 100 | 270102.87 | 0.65 | 3.94 | 0.297 | 0.189 | 157.60 | 522.76 |
| Comparison | 1 | 1 | 1 | 1 | | | 1 | 1 |

TABLE3

| | Our approach with shielding routing | | | | | | |
|---|---|---|---|---|---|---|---|
| Circuit | $C_{unit}$ (fF) | Area ($\mu m^2$) | M (%) | $\rho$ | $|DNL|_{max}$ (LSB) | $|INL|_{max}$ (LSB) | Power (nW) | Runtime (s) |
| DAC_6b | 21 | 6178.67 | 0.32 | 7.31 | 0.210 | 0.230 | 47.36 | 104.72 |
| DAC_7b | 30 | 17397.60 | 0.34 | 7.91 | 0.173 | 0.362 | 56.87 | 191.83 |
| DAC_8b | 38 | 34067.27 | 0.36 | 7.01 | 0.405 | 0.321 | 74.43 | 346.22 |

TABLE3-continued

| | Our approach with shielding routing | | | | | | |
|---|---|---|---|---|---|---|---|
| Circuit | $C_{unit}$ (fF) | Area ($\mu m^2$) | M (%) | ρ | $|DNL|_{max}$ (LSB) | $|INL|_{max}$ (LSB) | Power (nW) | Runtime (s) |
| DAC_9b | 51 | 75570.22 | 0.39 | 5.97 | 0.282 | 0.456 | 107.44 | 567.29 |
| DAC_10b | 82 | 244877.96 | 0.61 | 4.48 | 0.180 | 0.241 | 150.76 | 941.00 |
| Comparison | 0.54 | 0.66 | 0.94 | 1.15 | | | 0.68 | 2.59 |

The main contributions and features of this invention are summarized as follows:

(a) The proposed invention generates an optimized common-centroid layout of binary-weighted capacitors in a charge-scaling DAC while minimizing both area and power consumption, and satisfying accuracy/performance constraints with the existence of routing parasitic capacitance.

(b) The invention proposes a new common-centroid routing style consisting of three parasitic-aware routing patterns between two adjacent unit capacitors. Based on the presented routing style and routing patterns, the circuit accuracy/performance become predictable.

(c) The invention proposes a novel capacitor sizing and parasitic matching sequence (CP-sequence) to represent the unit capacitor size, routing topology, and routing patterns. Based on the CP-sequence, the genetic algorithm is adopted to simultaneously optimize both unit capacitor size and routing parasitic capacitance.

(d) Based on the proposed capacitor sizing, placement, and routing framework, the invention further introduces a shielding routing method for ultimately matching the routing parasitic capacitance. With shielding routing, the capacitor size, layout area, and power consumption of binary-weighted capacitors can be further reduced.

(e) Experimental results show that the proposed approaches with and without shielding routing can achieve the smallest layout area and the lowest power consumption of binary weighted capacitors in charge-scaling DACs while satisfying performance specification requirements, compared with the state-of-the-art approaches.

(f) The minimized unit capacitor size resulting from the proposed approach helps designers to further investigate the effect of local variation in each process node.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A non-transitory computer-readable medium containing instructions, which when read and executed by a computer, cause the computer to execute a method for parasitic-aware capacitor sizing and layout generation, wherein the method comprises steps of:

creating a capacitor sizing and parasitic matching sequence to represent a unit capacitor size, routing topology and routing patterns of a plural of nets in a capacitor network;

performing a shielding assignment to create a number of shielding portions of each net in said plural of nets;

performing a fitness evaluation of configurations of said capacitor sizing and parasitic matching sequence; and performing a shielding net routing to compensate unmatched parasitic capacitance of said configurations of said capacitor sizing and parasitic matching sequence.

2. The non-transitory computer-readable medium of claim 1, further comprising acquiring a process technology file.

3. The non-transitory computer-readable medium of claim 1, further comprising simultaneous common-centroid placement and trunk-wire planning of binary-weighted capacitors.

4. The non-transitory computer-readable medium of claim 3, further comprising common-centroid detailed routing after said simultaneous common-centroid placement and trunk-wire planning.

5. The non-transitory computer-readable medium of claim 4, wherein said common-centroid detailed routing includes common-centroid routing for bottom plates and top plates of said binary-weighted capacitors.

6. The non-transitory computer-readable medium of claim 5, wherein ratio of routing parasitics among different bits in a N-bit charge-scaling DAC is closer to ratio among said binary-weighted capacitors.

7. The non-transitory computer-readable medium of claim 1, wherein said routing patterns includes overlapped wire, nonoverlapped wire and single wire.

8. The non-transitory computer-readable medium of claim 1, wherein a genetic algorithm is applied to explore best configuration of said capacitor sizing and parasitic matching sequence for parasitic matching.

9. The non-transitory computer-readable medium of claim 1, said shielding portions are shielding wire segments.

10. The non-transitory computer-readable medium of claim 9, wherein said shielding wire segments are connected to some nets which connects bottom plates of said unit capacitors.

11. A method for parasitic-aware capacitor sizing and layout generation which is executed by a computer, the method comprising:

using the computer to perform the following:

creating a capacitor sizing and parasitic matching sequence to represent a unit capacitor size, routing topology and routing patterns of a plural of nets in a capacitor network;

performing a shielding assignment to create a number of shielding portions of each net in said plural of nets;

performing a fitness evaluation of configurations of said capacitor sizing and parasitic matching sequence; and performing a shielding net routing to compensate unmatched parasitic capacitance of said configurations of said capacitor sizing and parasitic matching sequence.

12. The method of claim 11, further comprising acquiring a process technology file.

13. The method of claim 11, further comprising simultaneous common-centroid placement and trunk-wire planning of binary-weighted capacitors.

14. The method of claim 13, further comprising common-centroid detailed routing after said simultaneous common-centroid placement and trunk-wire planning.

15. The method of claim 14, wherein said common-centroid detailed routing includes common-centroid routing for bottom plates and top plates of said binary-weighted capacitors.

16. The method of claim 15, wherein ratio of routing parasitics among different bits in a N-bit charge-scaling DAC is closer to ratio among said binary-weighted capacitors.

17. The method of claim 11, wherein said routing patterns includes overlapped wire, nonoverlapped wire and single wire.

18. The method of claim 11, wherein a genetic algorithm is applied to explore best configuration of said capacitor sizing and parasitic matching sequence for parasitic matching.

19. The method of claim 11, said shielding portions are shielding wire segments.

20. The method of claim 19, wherein said shielding wire segments are connected to some nets which connects bottom plates of said unit capacitors.

* * * * *